United States Patent
Joshi et al.

(10) Patent No.: US 8,688,453 B1
(45) Date of Patent: Apr. 1, 2014

(54) INTENT MINING VIA ANALYSIS OF UTTERANCES

(75) Inventors: Sachindra Joshi, New Delhi (IN); Shantanu Godbole, New Delhi (IN)

(73) Assignee: Nuance Communications, Inc., Burlington, MA (US)

( * ) Notice: Subject to any disclaimer, the term of this patent is extended or adjusted under 35 U.S.C. 154(b) by 205 days.

(21) Appl. No.: 13/037,114

(22) Filed: Feb. 28, 2011

(51) Int. Cl.
*G06F 17/27* (2006.01)
*G06F 17/21* (2006.01)
*G10L 15/00* (2013.01)
*G10L 15/04* (2013.01)
*G10L 21/00* (2013.01)
*G10L 25/00* (2013.01)
*G10L 15/18* (2013.01)
*G06F 7/00* (2006.01)
*G06F 17/30* (2006.01)
*G06F 17/00* (2006.01)
*G06F 17/20* (2006.01)
*G06F 17/22* (2006.01)
*G06F 17/24* (2006.01)
*G06F 17/25* (2006.01)
*G06F 17/26* (2006.01)
*G06F 17/28* (2006.01)

(52) U.S. Cl.
USPC ............... 704/257; 704/9; 704/10; 704/231; 704/251; 704/243; 704/270; 704/275; 704/252; 704/245; 707/736; 707/731; 707/738; 715/205

(58) Field of Classification Search
USPC ............ 704/231–257, 270, 270.1, 275, 9, 10; 707/723, 706, 829, 740, 733, 736–737, 707/731; 715/760, 728, 764, 202, 751
See application file for complete search history.

(56) References Cited

U.S. PATENT DOCUMENTS

| | | | | |
|---|---|---|---|---|
| 5,457,768 | A * | 10/1995 | Tsuboi et al. | 704/231 |
| 5,625,748 | A * | 4/1997 | McDonough et al. | 704/251 |
| 6,697,793 | B2 * | 2/2004 | McGreevy | 1/1 |
| 6,937,975 | B1 * | 8/2005 | Elworthy | 704/9 |
| 7,634,406 | B2 * | 12/2009 | Li et al. | 704/244 |
| 7,739,103 | B2 * | 6/2010 | Deane | 704/9 |
| 7,912,702 | B2 * | 3/2011 | Bennett | 704/9 |
| 7,983,896 | B2 * | 7/2011 | Ross et al. | 704/2 |
| 8,255,383 | B2 * | 8/2012 | Jones et al. | 707/708 |
| 8,311,807 | B2 * | 11/2012 | Kang et al. | 704/10 |
| 8,370,352 | B2 * | 2/2013 | Lita et al. | 707/736 |
| 8,380,511 | B2 * | 2/2013 | Cave et al. | 704/270 |
| 2002/0002454 | A1 * | 1/2002 | Bangalore et al. | 704/9 |
| 2004/0078190 | A1 * | 4/2004 | Fass et al. | 704/7 |

(Continued)

*Primary Examiner* — Paras D Shah
*Assistant Examiner* — Anne Thomas-Homescu
(74) *Attorney, Agent, or Firm* — Chapin IP Law, LLC

(57) ABSTRACT

According to example configurations, a speech processing system can include a syntactic parser, a word extractor, word extraction rules, and an analyzer. The syntactic parser of the speech processing system parses the utterance to identify syntactic relationships amongst words in the utterance. The word extractor utilizes word extraction rules to identify groupings of related words in the utterance that most likely represent an intended meaning of the utterance. The analyzer in the speech processing system maps each set of the sets of words produced by the word extractor to a respective candidate intent value to produce a list of candidate intent values for the utterance. The analyzer is configured to select, from the list of candidate intent values (i.e., possible intended meanings) of the utterance, a particular candidate intent value as being representative of the intent (i.e., intended meaning) of the utterance.

27 Claims, 16 Drawing Sheets

(56) References Cited

U.S. PATENT DOCUMENTS

| | | | |
|---|---|---|---|
| 2004/0133418 A1* | 7/2004 | Turcato et al. | 704/9 |
| 2004/0148170 A1* | 7/2004 | Acero et al. | 704/257 |
| 2005/0049867 A1* | 3/2005 | Deane | 704/245 |
| 2005/0144000 A1* | 6/2005 | Yamasaki et al. | 704/252 |
| 2007/0005369 A1* | 1/2007 | Potter | 704/275 |
| 2007/0136048 A1* | 6/2007 | Richardson-Bunbury et al. | 704/9 |
| 2008/0221903 A1* | 9/2008 | Kanevsky et al. | 704/275 |
| 2010/0010805 A1* | 1/2010 | Balchandran et al. | 704/9 |
| 2010/0023506 A1* | 1/2010 | Sahni et al. | 707/5 |
| 2010/0131835 A1* | 5/2010 | Kumar et al. | 715/205 |
| 2010/0268536 A1* | 10/2010 | Suendermann et al. | 704/243 |
| 2010/0324901 A1* | 12/2010 | Carter et al. | 704/255 |
| 2011/0029533 A1* | 2/2011 | Jayakody et al. | 707/738 |
| 2012/0053927 A1* | 3/2012 | Kulkarni et al. | 704/9 |
| 2012/0290293 A1* | 11/2012 | Hakkani-Tur et al. | 704/9 |
| 2012/0310628 A1* | 12/2012 | Rathod et al. | 704/9 |
| 2012/0317107 A1* | 12/2012 | Bedrax-Weiss et al. | 707/731 |

* cited by examiner

CANDIDATE WORD GROUPING 145-1

EXAMPLE UTTERANCES

■ speak_representative
▲ speak to a representative
▲ speak to a customer service representative
▲ i would like to speak to a representative
▲ i need to speak to a customer service representative
▲ i'd like to speak i'd like to speak to a customer service
▲ i have a unscheduled delivery i'd like to speak to a customer service representative please
▲ i need to speak to a representative with regard to delivery of water they just delivered water and they didn't deliver the right
▲ i wanna speak to somebody here i wanna speak to your customer service representative

CANDIDATE WORD GROUPING
145-2

EXAMPLE UTTERANCES

- cancel_delivery (337)
  - i'd like to cancel my next delivery
  - i like to cancel the delivery on friday the twelfth
  - yeah i'm calling understand we have a delivery tomorrow i just call in to cancel the delivery tomorrow because we have enough water
  - i'd like to cancel my next delivery on october monday october thirteen
  - delivery i don't need the delivery which is scheduled on monday twelfth i wanted to cancel this delivery which is next delivery which is scheduled on april twelfth
  - i want to cancel my next delivery which is scheduled for the twenty seventh i'll be out of town so
  - i'm scheduled for a delivery on the april nineteenth monday i wanna cancel the delivery because we're gonna we're going to be away and won't be anybody you know to accept it so i don't wanna any delivery that day
  - ...

FIG. 6

CANDIDATE WORD GROUPING 145-3

EXAMPLE UTTERANCES

■ pay_bill
▲ wanna pay the bill
▲ i would like to pay my bill
▲ i'd like to know are you a real person i'd like to pay my bill
▲ i would like to pay a bill with a credit card
▲ i wanna know how i can pay the bill by phone
▲ i would yes hello i would like to pay a bill by by phone check phone
▲ well i was just wondering i've not done this before but i'm stuck at home i fell and hurt my knee if i could pay my arrowhead water bill on my visa card
▲ i wanna something about my bill my bill i pay send me a bill for seventy eight fourteen my bill has been paid

STATISTICAL INFORMATION 160

- speak_representative(457)
- cancel_delivery(337)
- order_water(312)
- place_order(226)
- pay_bill(207)
- when_delivery(187)

- cancel_service(173)
- repeat_that(164)
- skip_delivery(142)
- speak_someone(135)
- change_order(129)
- cancel_account(74)

- speak_rep(66)
- change_address(47)
- close_account(21)
- check_bill(20)
- need_balance(19)
- order_cooler(8)

•••

| | LABEL | INTENT VALUES (WORD GROUPS) |
|---|---|---|
| 1 | AGENT | speak_representative, speak_someone, talk_person, like_talk |
| 2 | SKIP_A_DELIVER | skip_delivery, skip_order, hold_delivery, skip_deliveries |
| 3 | AGENT_BILLING | have_bill, talk_bill, speak_billing, talk_bill |
| 4 | ORDER_EXTRA | order_water, place_order, need_bottles, need_cups |
| 5 | READ_DELIVERY | when_delivery, check_delivery, confirm_delivery, check_order |
| 6 | CHANGE_ITEMS | change_order, change_water, change_amount |
| 7 | DEILVERY | need_delivery, scehdule_delivery, have_delivery, place_delive |
| 8 | NEW_ACCOUNT | open_account, set_account |
| 9 | PAY_A_BILL | pay_bill, make_payment, like_pay, pay_invoice |
| 10 | CANCEL_DELIVER | cancel_delivery, cancel_order, stop_delivery |
| 11 | GOOD_BYE | thank_you, end_call |
| 12 | ACCOUNT_BALAN | know_balance, check_balance, need_balance, what_balance |
| 13 | CANCEL_ACCOU | cancel_service, cancel_account, discontinue_service |
| 14 | CHANGE_ADDRE | change_address, change_account, change_name, |
| 15 | COOLER | need_cooler, order_cooler, get_cooler, need_dispenser |
| 16 | INVOICE_COPY | need_copy, copy_invoice, need_invoice |

| Intent | Majority Label | Other Labels |
|---|---|---|
| speak_representative(457) | AGENT (452) 98.9% | AGENT_BILLING (4) BILLING (1) |
| cancel_delivery (337) | CANCEL_DELIVERY (333) 98.8% | CANCEL_ACCOUNT(3) CHANGE_ITEMS(1) |
| pay_bill (207) | PAY_A_BILL (207) 100% | |
| calling_something(492) | SOMETHINGS_ELSE (492) 100% | |
| order_water(311) | ORDER_EXTRA(304) 97.7% | ADD_DELIVERY(3) DELIVERY(1) |
| cancel_service (173) | CANCEL_ACCOUNT(165) 95.4% | CANCE_A_DELIVERY(6) AGENT(1) |
| skip delivery (142) | SKIP_A_DELIVERY(142) 100% | |
| when_delivery(187) | READ_OUT_DELIVRY(184) 98.4% | BILLING(1), ORDER_EXTRA(1), AGENT(1) |

1200 

INTENT MINING VIA ANALYSIS OF UTTERANCES

BACKGROUND

Recent developments in computers and corresponding speech recognition software algorithms have made it possible to control computer equipment via spoken input. Thus, it is now becoming more common that users are able to control their computers, electronics, personal devices, call routing, etc., via speech input.

Speech recognition systems are highly complex and operate by matching an acoustic signature of an utterance with acoustic signatures of words in a language model. As an example, according to conventional speech recognition systems, a microphone first converts a received acoustic signature of an uttered word into an electrical signal. An A/D (analog-to-digital) converter is typically used to convert the electrical signal into a digital representation of the uttered word. A digital signal processor converts the captured electrical signal from the time domain to the frequency domain.

Generally, as another part of the speech recognition process, the digital signal processor breaks down the utterance into its spectral components. Typically, the amplitude or intensity of the digital signal at various frequencies and temporal locations are then compared to a language model to determine the one or more words that were uttered.

Certain conventional speech recognition systems can be used for classifying utterances. For example, a conventional speech recognition system can receive and convert an utterance into respective text. In certain instances, a conventional speech recognition system can be configured to classify the utterance based on a key word in the utterance.

BRIEF DESCRIPTION

Conventional speech recognition systems can suffer from drawbacks. For example, conventional speech recognition typically analyze an utterance for presence of words that indicate a likely class to which the utterance belongs. However, the accuracy of the classification can be quite low because an utterance may include many words, making the intended meaning of the utterance difficult to determine.

Embodiments herein deviate with respect to conventional speech recognition systems to provide accurate speech utterance classification. For example, one embodiment herein includes a speech processing system to identify one or more intended meanings of a received utterance based on word groupings derived from words detected in the utterance. In one embodiment, the speech processing system tags the utterance with respective one or more tags indicative of one or more classes believed to represent an intended meaning of the utterance.

More specifically, a speech processing system according to embodiments herein can include a syntactic parser, a word extractor, word pattern rules, and an analyzer. To identify an intended general meaning of the utterance, the speech processing system performs a number of tasks on a received utterance.

In one embodiment, the syntactic parser of the speech processing system parses a received utterance to identify syntactic relationships amongst words in the utterance. The word extractor creates sets of words using words in the utterance based at least in part on the syntactic relationships identified by the parser. As an example, the word extractor can utilize the word pattern rules to identify groupings of related words in the utterance that most likely represent an intended meaning of the utterance.

In one embodiment, the pattern rules specify which type and/or location of related words in the utterance that are to be used to create the sets of words. Accordingly, embodiments herein can include creating the sets of words can include utilizing the identified syntactic relationships of words to identify groupings of related words in the utterance; and applying a set of pattern rules or word extraction rules to the identified syntactic relationships to identify types and/or locations of words in the utterance to create the sets of words.

Subsequent to creating the groupings of words, an analyzer in the speech processing system maps each set of the sets of words produced by the word extractor to a respective candidate intent value to produce a list of candidate intent values for the utterance. Thus, if there are multiple candidate word groupings derived form the utterance, the received utterance can be mapped multiple candidate intent values. As its name suggests, a candidate intent value is a possible intended meaning of the utterance.

An utterance can have one or more intended meanings; the speech processing system can be configured to identify one or more most likely intended meanings of the utterance under test. In one embodiment, the analyzer is configured to select, from the list of possible intended meanings of the utterance, a particular candidate intent value as being representative of the intent (i.e., intended meaning) of the utterance.

The speech processing system can be configured to maintain statistical information for a pool of previously received utterances to determine the meaning of future utterances. For example, as previously discussed, the statistical information can indicate a frequency of receiving utterances of different intent types. The statistical information can be updated over time to reflect that a most recently received and analyzed utterance was assigned the particular candidate intent value as discussed above.

Selection of particular intent value amongst a group of possible intents for an utterance can be based on selection criteria employed by the analyzer. For example, in one embodiment, the analyzer identifies a frequency of occurrence that utterances in a pool of previously received utterances were of a same intent type as that of a first candidate intent value for the newly received utterance; the analyzer also identifies a frequency of occurrence that utterances in the pool of previously received utterances were of a same intent type as that of the second candidate intent value for the newly received utterance; and so on. As previously discussed, the analyzer can identify multiple possible classes in which to categorizes or classify the received utterance. In one embodiment, the analyzer then selects the a particular candidate intent value for assigning to the utterance depending on which of the possible candidate intent values (e.g., first candidate intent value, second candidate intent value, etc.) occurred more often in the pool for the previously received utterances. Thus, according to one embodiment, the analyzer can perform a frequency analysis and then sort the candidate meanings. As previously discussed, the selected candidate value indicates a likely dominant subject matter or theme of the utterance.

In yet further embodiments, the speech processing system includes a set of tags or labels. In one embodiment, a tagging resource (such as the analyzer or other suitable resource) identifies an appropriate tag that is representative of the intent value (or selected meaning) selected for the utterance. The tagging resource then tags the utterance with the appropriate tag to indicate a likely dominant subject matter intended by words in the received utterance. Accordingly, embodiments herein can include classifying one or more received utterances using tags.

As discussed above and below in further embodiments, techniques herein are well suited for use in software and/or hardware applications implementing speech recognition and classification of utterances based on intended meanings. However, it should be noted that embodiments herein are not limited to use in such applications and that the techniques discussed herein are well suited for other applications as well.

These and other embodiments are discussed in more detail below.

As mentioned above, note that embodiments herein can include a configuration of one or more computerized devices, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or microcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, one particular embodiment of the present disclosure is directed to a computer program product that includes a computer readable storage medium having instructions stored thereon for speech recognition such as converting of an utterance to corresponding text. For example, in one embodiment, the instructions, when executed by a processor of a respective computer device, cause the processor to: parse an utterance to identify syntactic relationships amongst words in the utterance; create or group sets of words from the utterance based at least in part on the syntactic relationships; map each set of the sets of words to a respective candidate intent value; produce a list of candidate intent values for the utterance based on the mapping; and select, from the list, a candidate intent value as being representative of an intent of the utterance.

The ordering of the steps has been added for clarity sake. These steps can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein can be embodied strictly as a software program, as a hybrid of software and hardware, or as hardware alone such as within a processor, or within an operating system or a within a software application. Example embodiments of the invention may be implemented within products and/or software applications such as those manufactured by Nuance Communications, Inc., Burlington, Mass., USA.

Additionally, although each of the different features, techniques, configurations, etc., herein may be discussed in different places of this disclosure, it is intended that each of the concepts can be executed independently of each other or, where suitable, the concepts can be used in combination with each other. Accordingly, the one or more present inventions as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), and additional points of novelty, the reader is directed to the Detailed Description section and corresponding figures of the present disclosure as further discussed below.

BRIEF DESCRIPTION OF THE DRAWINGS

FIG. 5 is an example diagram illustrating a listing of different utterances that have been classified under a representative intent value according to embodiments herein.

FIG. 6 is an example diagram illustrating a listing of different utterances that have been classified under a representative intent value according to embodiments herein.

FIG. 7 is an example diagram illustrating a listing of different utterances that have been classified under a representative intent value according to embodiments herein.

FIG. 11 is an example diagram illustrating intent values (e.g., representative word groupings) assigned to a respective subject matter label according to embodiments herein.

FIG. 12 is an example diagram illustrating intent values and corresponding assigned subject matter labels according to embodiments herein.

Figure 1:
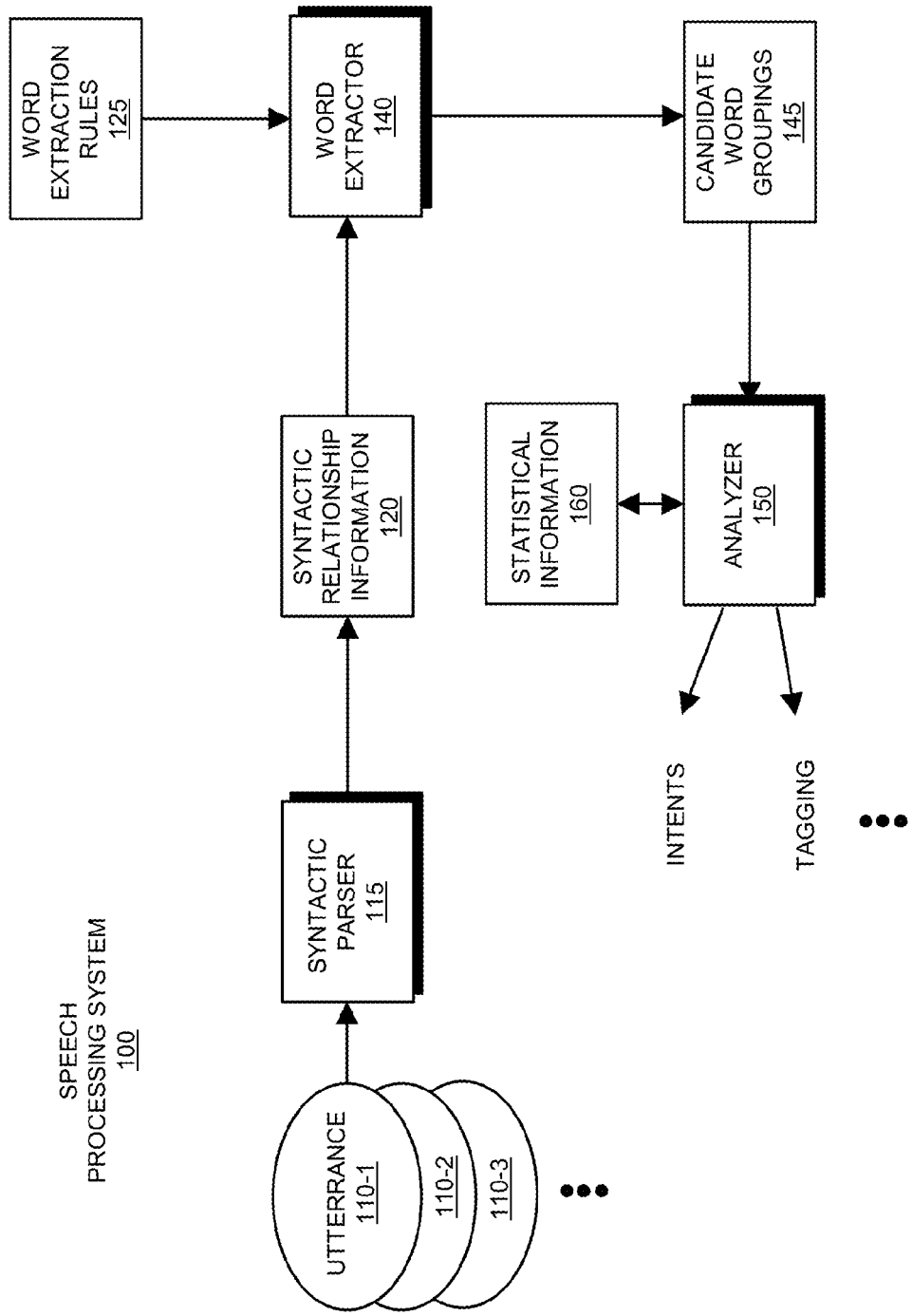
FIG. 1 is an example block diagram of a speech processing system to perform intent mining for one or more utterances according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one embodiment, a speech processing system includes a syntactic parser, a word extractor, word extraction rules, and an analyzer. The syntactic parser of the speech processing system parses the utterance to identify syntactic relationships amongst words in the utterance. In accordance with the syntactic relationship information, the word extractor utilizes the word extraction rules to identify groupings of related words in the utterance that most likely represent an intended meaning of the utterance. The analyzer in the speech processing system maps each set of the sets of words produced by the word extractor to a respective candidate intent value to produce a list of candidate intent values for the utterance. The candidate intent values represent a possible intended meaning of the utterance. The analyzer is configured to select, from the list of candidate intent values (i.e., possible intended meanings) of the utterance, a particular candidate intent value as being representative of a dominant intent of the utterance.

Now, referring to the figures, FIG. 1 is an example diagram illustrating a speech processing system 100 according to embodiments herein. As shown, speech processing system 100 includes a syntactic parser 115, word extractor 140, and an analyzer 150. The speech processing system 100 can receive one or more utterances 110-1, 110-2, 100-3, . . . (collectively, utterances 110) in response to a query such as "How may I assist you?"

As previously discussed, embodiments herein deviate with respect to conventional speech recognition systems to provide accurate speech utterance classification. For example, one embodiment herein includes a speech processing system 100 to identify one or more intended meanings of a received utterance 110. The speech processing system 100 can tag the utterance with respective one or more tags indicative of one or more classes that appear to best represent an intended meaning of the utterance 110.

To identify an intended general meaning of a received utterance or sequence of inputted text, the speech processing system 110 performs a number of tasks on a received utterance. For example, the syntactic parser 115 of the speech processing system 100 converts the utterance to respective text and parses the text in the utterance 110 to produce syntactic relationship information 120. The syntactic relationship information 120 indicates syntactic relationships amongst the text-based words in the utterance 110.

The word extractor 140 creates sets of words (e.g., candidate word groupings 145) using words in the utterance 110 based at least in part on the syntactic relationship information 120 identified by the syntactic parser 115. As an example, the word extractor 140 can utilize the word extraction rules 125 to identify one or more groupings of related words in the utterance that most likely represent an intended meaning of the utterances.

In one embodiment, the word extraction rules 125 includes patterns and/or templates that indicate, for example, which types of words, locations of words, etc., in the utterance will be used to create respective word groupings.

In accordance with further embodiments, the word extraction rules 125 specify which type and/or location of related words in the utterances are to be used to create the sets of words for a respective utterance. Accordingly, embodiments herein include creating the sets of words for a respective utterance under test can include utilizing the identified syntactic relationship information 120 to identify groupings of related words in the respective utterance; and applying a set of word extraction rules 125 to the identified syntactic relationships and utterance under test to identify types and/or locations of words in the utterance to create the sets of words.

Subsequent to creating one or more candidate word groupings 145 for a respective utterance, an analyzer 150 in the speech processing system 150 maps each set of the sets of words (e.g., candidate word groupings 145) produced by the word extractor 140 to a respective candidate intent value to produce a list of candidate intent values for the utterance. As its name suggests, a candidate intent value is a possible intended meaning of the utterance.

Note that a candidate word grouping produced by the speech processing system 100 for a respective utterance can include any number of words such as a single word or two or more words. The word extractor 140 can produce one or multiple candidate word groupings 145 for each utterance.

An utterance can have one or more intended meanings; the speech processing system 100 can be configured to identify one or more most likely intended meanings of an utterance under test. If there is only one word grouping and corresponding candidate intent value produced for an utterance under test, then the analyzer can assign the single intended meaning of the single candidate intent value to the utterance.

If analysis of an utterance produces multiple possible candidates, subsequent to determining the list of possible intended meanings (e.g., candidate intent values) of an utterance under test, the analyzer 150 applies further processing to narrow down the multiple possible intended meanings of the utterance to a at least most likely representative of the utterance. For example, in one embodiment, the analyzer is configured to select, from the list of possible intended meanings of the utterance as indicated by the candidate word groupings 145, a particular candidate intent value as being representative of the intent (i.e., intended meaning) of the utterance.

This technique of processing can be applied to each of the received utterances 110. Thus, in other words, the speech processing system 100 can be configured to classify the received utterances based on intended meaning.

The speech processing system 10 can be configured to maintain statistical information 160 for a pool of previously received utterances. For example, as previously discussed, the statistical information 160 can indicate an historical frequency of receiving utterances of different intent types. For newly received utterances and determination of respective intended meanings, the statistical information 160 can be updated over time to reflect that a most recently received and analyzed utterance was assigned a particular candidate intent value. Thus, over time, the statistical information 160 can be configured to keep track of how often the speech processing system 100 receives utterances of each particular intent type.

Selection of an intent value amongst a group of possible intents to assign to a newly received utterance under test can be based on selection criteria employed by the analyzer 150. In such an embodiment, the analyzer 150 selects the a particular candidate intent value for assigning to the utterance depending on which of the possible candidate intent values (e.g., first candidate intent value, second candidate intent value, etc.) occurred more often in the pool for the previously received utterances as specified by the statistical information 160. Thus, according to one embodiment, the analyzer 150 can perform a frequency analysis and then sort the candidate meanings to perform intent mining. As previously discussed, the selected candidate value indicates a likely dominant subject matter or theme of the utterance.

One embodiment includes so-called clustering. In such an embodiment, for each intent, the analyzer 150 compute such as respective frequency and sorts the intents. For (i=1_1, 1_2, ..., i_n), let U={u_1, u_2, ..., u_m} be the utterance containing i, For j in U, if the j is already not covered, then j is covered by i. Mark j covered.

Note that any suitable method can be implemented to perform clustering.

In yet further embodiments, the speech processing system 100 can include a set of tags for assigning to the utterances. In one embodiment, a tagging resource (such as the analyzer 150 or other suitable resource) identifies an appropriate tag that is representative of the intent value (or selected meaning) for an utterance. The tagging resource then tags the utterance with the appropriate tag to indicate a likely dominant subject matter intended by words in the received utterance. Accordingly, embodiments herein can include classifying one or more received utterances and then applying tags to identify a respective intended meaning.

Figure 2:
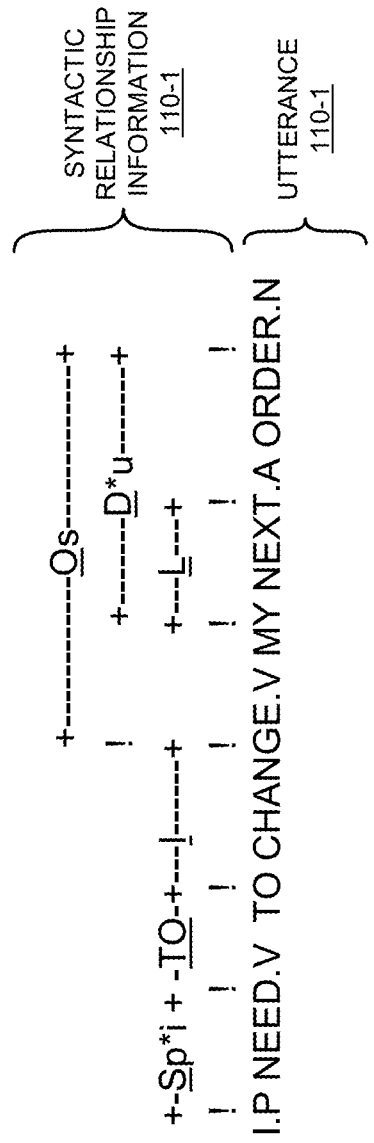
FIG. 2 is an example diagram illustrating a sample utterance and corresponding relationship information generated by a syntactic parser according to embodiments herein.

FIG. 2 is an example diagram illustrating a sample utterance and corresponding relationship information 120 according to embodiments herein. Syntactic parser 115 receives the example utterance 110-1 "I would like to speak with a customer representative." Based on parsing, the syntactic parser 115 produces syntactic relationship information 120-1 (p=pronoun, voltage=verb, a=adjective, network=noun, ... ) as shown. By way of a non-limiting example, a Link Grammar parser can be used to parse the received utterance 110-1.

Figure 3:
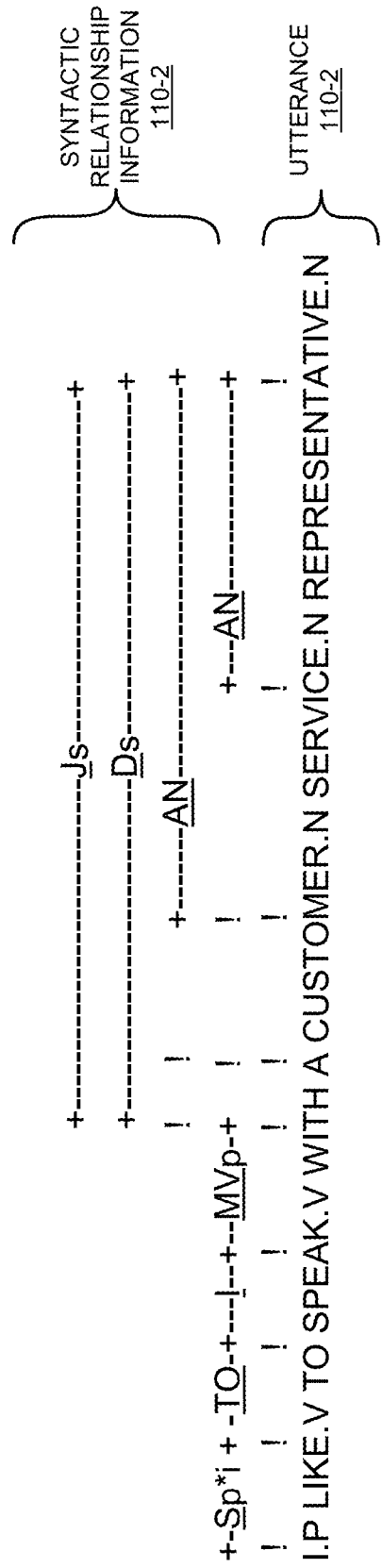
FIG. 3 is an example diagram illustrating a sample utterance and corresponding relationship information generated by a syntactic parser according to embodiments herein.

FIG. 3 is an example diagram illustrating a sample utterance and corresponding relationship information according to embodiments herein. Syntactic parser 115 receives the example utterance "I would like to speak with a customer service representative." Based on parsing rules, the syntactic parser 115 produces syntactic relationship information 120-2 as shown (e.g., p=pronoun, voltage=verb, a=adjective, network=noun, ... ).

Figure 4:
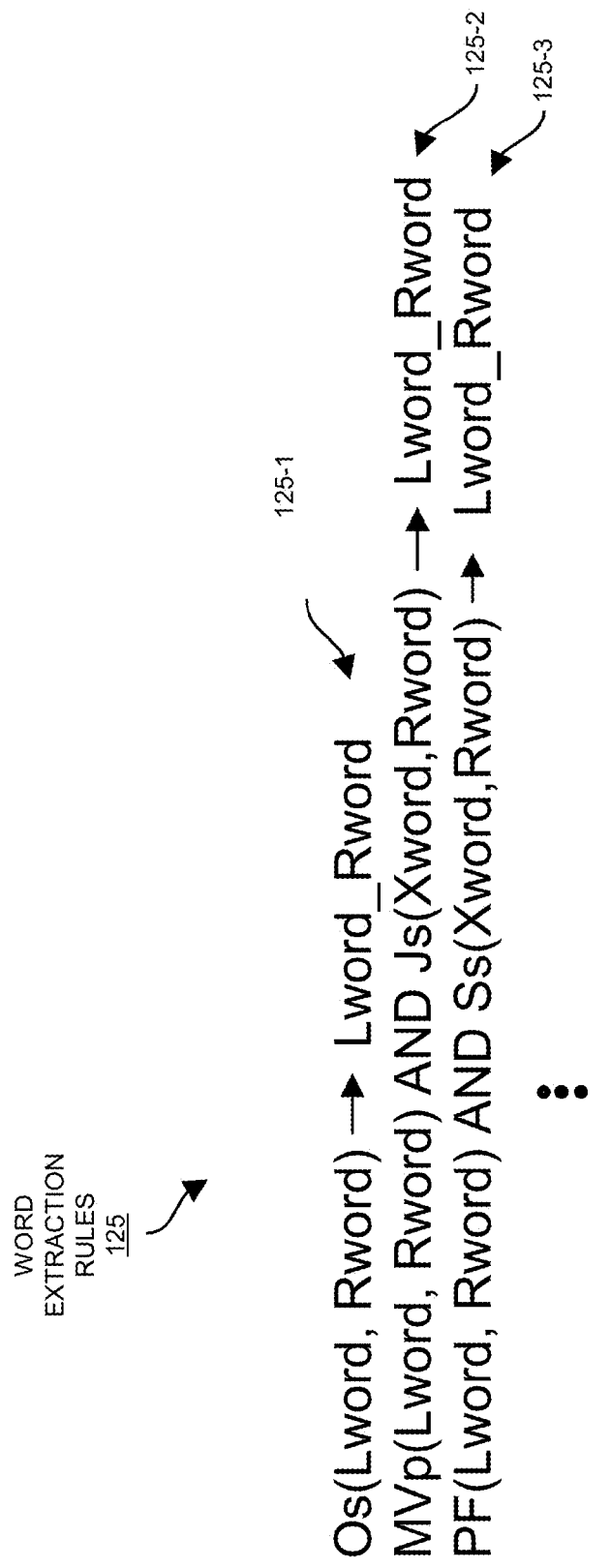
FIG. 4 is an example diagram illustrating pattern or word extraction rules according to embodiments herein.

FIG. 4 is an example diagram illustrating word extraction rules 125 according to embodiments herein. In one embodiment, in conjunction with the syntactic relationship information 125, the word extraction rules 125 are used to identify the location of different types of words in a received utterance that are to be used to generate respective candidate word groupings 145.

During operation, the word extractor 140 applies these rules to produce candidate word groupings 145. In the above example FIG. 2, the word extractor 140 applies word extraction rule 125-1 (FIG. 4) to example utterance 110-1 "I need to change my next order." For this utterance 110-1 (FIG. 2) and using word extraction rule 125-1, Lword="change" and Rword="order" to produce the candidate word grouping change_order based on format Lword_Rword.

In the above example FIG. 3, the word extractor 140 applies word extraction rule 125-2 to example utterance 110-2 "I would like to speak with a customer representative." For this utterance 110-2 and application of word extraction rule 125-2 FIG. 4) as shown, MVp Lword="speak", MVp Xword="with", Js Xword="with", Js Rword="representative" to produce the candidate word grouping speak_representative based on format Lword_Rword.

As discussed below, a given utterance can include one candidate word grouping or multiple candidate word groupings.

FIG. 5 is an example diagram illustrating a listing of different example utterances that have been classified under a respective intent value (e.g., speak_representative) according to embodiments herein. That is, processing of each of the example utterances in FIG. 5 via the speech processing system 100 would produce the candidate word grouping 145-1 (e.g., a candidate intent value indicating a possible intended meaning of the utterance) for the respective utterance. For example, during processing, syntactic parser 115 parses a respective utterance to produce corresponding syntactic relationship information 120. The word extractor 140 then utilizes the respective word extraction rules 125 to identify that the respective utterance includes the respective candidate word grouping 145-1 speak_representative.

FIG. 6 is an example diagram illustrating a listing of different utterances that have been classified under a respective intent value (e.g., cancel_delivery) according to embodiments herein. That is, processing of the example utterances 110 in FIG. 6 via the speech processing system 100 would produce the candidate word grouping 145-2 (e.g., a candidate intent value indicating a possible intended meaning of the utterance) for the respective utterance. For example, during processing, syntactic parser 115 would parse the utterances to produce corresponding syntactic relationship information. The word extractor 140 then utilizes the respective word extraction rules 125 to identify that each of the utterances 110 as shown include the respective candidate word groupings 145-1.

FIG. 7 is an example diagram illustrating a listing of different utterances that have been classified under a respective intent value (e.g., pay_bill) according to embodiments herein. That is, processing of each of the example utterances 110 in FIG. 7 via the speech processing system 100 would produce the candidate word grouping 145-3 (e.g., a candidate intent value indicating a possible intended meaning of the utterance) for the respective utterance. During processing, syntactic parser 115 parses a respective utterance to produce corresponding syntactic relationship information. The word extractor 140 then utilizes the respective word extraction rules 125 to identify that the respective utterance includes the respective candidate word grouping 145-1 pay_bill.

Figure 8:
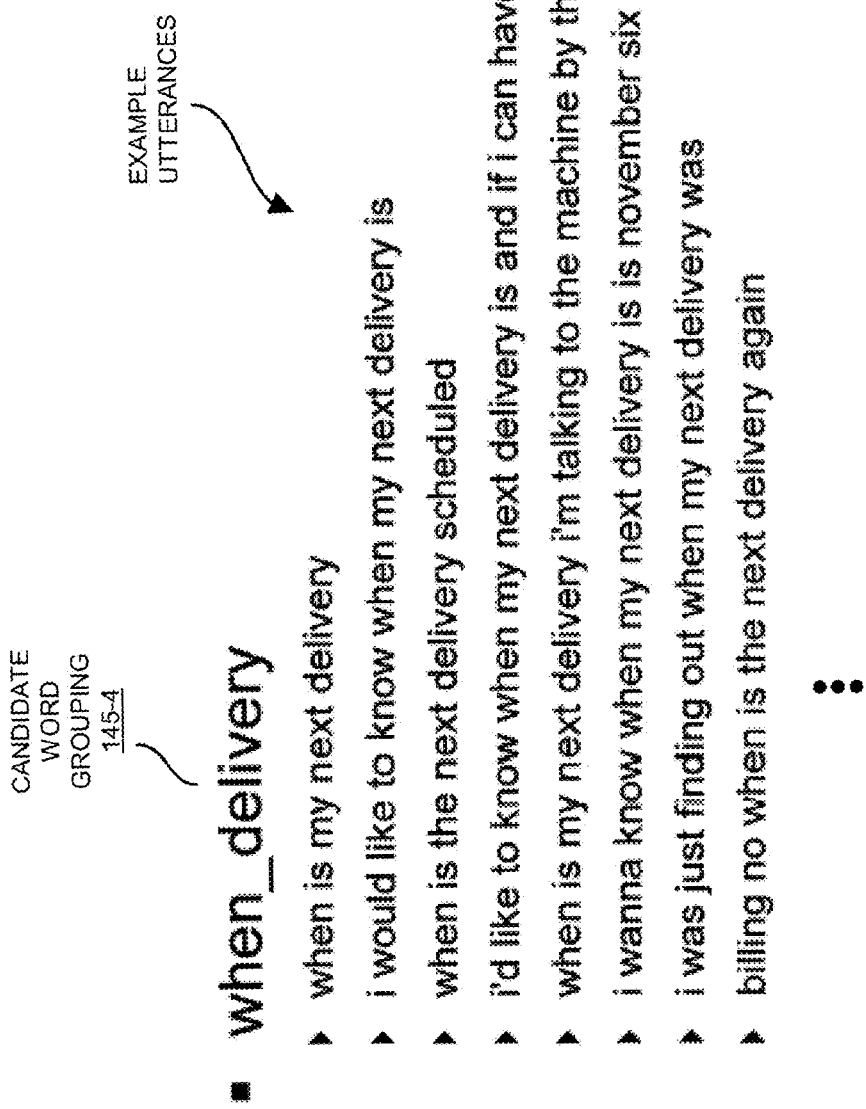
FIG. 8 is an example diagram illustrating a listing of different utterances that have been classified under a representative intent value according to embodiments herein.

FIG. 8 is an example diagram illustrating a listing of different utterances that have been classified under a respective intent value (e.g., when_delivery) according to embodiments herein. That is, processing of each of the example utterances 110 in FIG. 8 via the speech processing system 100 would produce the candidate word grouping 145-4 (e.g., a candidate intent value indicating a possible intended meaning of the utterance) for the utterance. During processing, syntactic parser 115 parses a respective utterance to produce corresponding syntactic relationship information. The word extractor 140 then utilizes the respective word extraction rules 125 to identify that the respective utterance includes the respective candidate word grouping 145-1 when_delivery.

Figure 9:
FIG. 9 is an example diagram illustrating sets of words extracted from utterances and corresponding frequency information of occurrence according to embodiments herein.

FIG. 9 is an example diagram illustrating statistical information 160 indicating how often a respective intent value or candidate word grouping occurs in a pool of received utterances according to embodiments herein. For example, for a pool of received utterances, 457 of the utterances in the received pool included the intent value (or group of words) speak_representative, 337 of the utterances in the received pool included the intent value (or group of words) cancel_delivery, 312 of the utterances in the received pool included the intent value (or group of words) place_order, etc. Accordingly, embodiments herein can include keeping track of a frequency of occurrence for each of the different intent values for a pool of received utterances.

In one embodiment, the speech processing system 100 is unsupervised and requires no training data. The speech processing system 100 can collect and record the statistical information 160 over time as the speech processing system 100 receives and processes the additional utterances. Accordingly, embodiments herein include maintaining statistical information for a pool of previously received utterances. As previously discussed, the statistical information 160 indicate a frequency of receiving utterances of different intent types. The speech processing system 100 updates the statistical information 160 to reflect that the different utterances were assigned the intent values.

Figure 10:
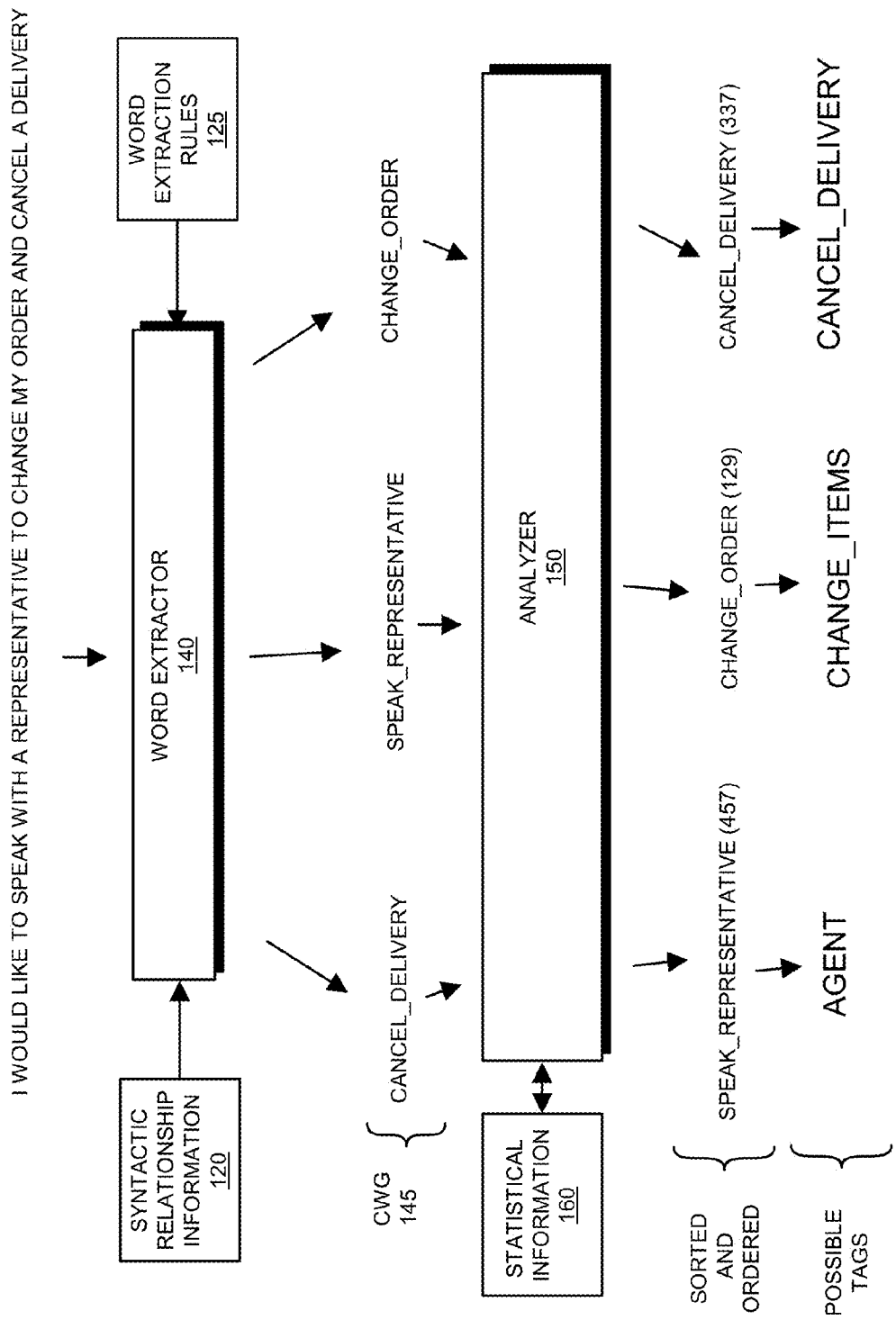
FIG. 10 is an example diagram illustrating application of intent mining to an example according to embodiments herein.

FIG. 10 is an example diagram illustrating intent values assigned to a respective subject matter label according to embodiments herein. Assume in this example that the speech processing system 100 receives the utterance "I would like to speak with a representative to change my order and cancel a delivery" in response to a query such as "How may I assist you?" In such an instance, the syntactic parser 115 processes the received utterance to produce respective syntactic relationship information 120 for the utterance.

In a manner as previously discussed, the word extractor 140 applies the word extraction rules 125 (such as those in FIG. 4) and syntactic relationship information 120 to identify candidate word groupings 145 such as speak_representative, change_order, and cancel_delivery as possible intended meanings of the utterance.

As previously discussed, the speech processing system 100 utilizes the identified syntactic relationships 120 of words to identify how the words in the received utterance are related. The speech processing system 100 then initiates application of word extraction rules or pattern rules to related words in the utterance to identify locations of words and produce candidate word groupings 145. As previously discussed, the word extraction rules 125 specifying which type of related words in the utterance to create the candidate sets of words.

In the example shown, the syntactic parser 115 produces respective syntactic relationship information 120 for the received utterance "I would like to speak with a representative to change my order and cancel a delivery". By applying word extraction rules 125 to syntactic relationship information 120 and text in received utterance in a manner as previously discussed, the word extractor 140 produces a first set of words (e.g., one of candidate word groupings 145) to include a first word and a second word in the utterance such as "speak" and "representative", the first word "speak" is syntactically related to the second word "representative" as indicated by the identified syntactic relationships 120 as previously discussed; the word extractor 140 produces a second set of words (e.g., another of candidate word groupings 145) to include a third word such as "change" and a fourth word "order" in the utterance, the third word "change" is syntactically related to the fourth word "order" as indicated by syntactic relationship information 120 for the received utterance; the word extractor 140 produces a third set of words (e.g., yet another of candidate word groupings 145) to include a fifth word such as "cancel" and a sixth word "delivery" in the utterance, the fifth word "cancel" is syntactically related to the sixth word "delivery" as indicated by syntactic relationship information 120 for the utterance.

As shown, the word extractor 140 maps the combination of words including "speak" and "representative" to possible intent value speak_representative; the word extractor 140 maps the combination of words including "change" and "order" to possible intent value change_order; the word extractor 140 maps the combination of words including "cancel" and "delivery" to possible intent value cancel_delivery.

Given these candidate word groupings 145 (namely, speak_representative, change_order, and cancel_delivery), the received utterance potentially can be classified in a number of different classes.

In one embodiment, the speech processing system 100 determines a dominant intent for assigning to the utterance based on statistical information 160 in FIG. 9. For example, the speech processing system 100 can determine how often the word groupings in the instance utterance under test appeared in other received utterances and select. The most often occurring intent value can be chosen for the instant utterance under test as the most likely intended meaning. For example, the intent value speak_representative appeared in 457 previously received utterances of a pool of received utterances, the intent value change_order appeared in 129 previously received utterances of the pool of received utterance, the intent value cancel_delivery appeared in 337 previously received utterances of a pool of received utterance.

In this example, based on the analysis, the analyzer 150 selects the candidate intent value speak_representative as being the most likely dominant intent for the utterance because it occurred most often in other previously received utterances. That is, in one example embodiment, the analyzer identifies a frequency of occurrence (e.g., number of utterances in a pool that include a specific grouping of words) that utterances in a pool of previously received utterances were of a same intent type as that of a first candidate intent value for the newly received utterance; the analyzer also identifies a frequency of occurrence that utterances in the pool of previously received utterances were of a same intent type as that of the second candidate intent value for the newly received utterance; and so on. The analyzer 150 then selects an intent value for the utterance under test "I would like to speak with a representative to change my order and cancel a delivery" based on the most often occurring intent value in previous utterances.

The analyzer 150 can be configured to tag the respective utterance depending on the one or more intent values (namely, speak_representative, change_order, and cancel_delivery) identified for the utterance. FIG. 11 illustrates how to map a respective intent value for an utterance to a respective label. Based on FIG. 11 is an example diagram illustrating intent values and corresponding assigned subject matter labels according to embodiments herein. As shown, the label map can include multiple labels for potentially tagging the received utterance. Each of the labels can be assigned multiple word groupings that commonly appear in utterance that fall into the corresponding label. For example, the label "AGENT" is a candidate reserved for tagging any utterance including the word groupings speak-representative, speak_someone, talk_person, etc.; the label "SKIP_A_DELIVERY" can be reserved for tagging any utterance including the word groupings skip_delivery, skip_order, hold_delivery, etc.; the label "AGENT_BILLING" can be reserved for tagging any utterance including the word groupings have_bill, talk_bill, speak_billing, etc.; and so on.

Thus, the analyzer 150 can utilize the label map 1100 to identify how to label received utterances. Depending on the embodiment, an utterance can be assigned one or more labels indicating a class in to which the utterance falls. If desired, the example utterance which produces candidate word groupings speak_representative, change_order, and cancel_delivery can be assigned labels AGENT, CHANGE_ITEMS, AND CAN- CEL_DELIVERY. The utterance also can be labeled with only a single label corresponding to the dominant intent value (e.g., speak_representative) such as AGENT.

FIG. 12 is an example diagram illustrating possible association of one or more labels to an utterance according to embodiments herein.

For example, as previously discussed with respect to FIGS. 5-9, as shown in listing 1200, 457 utterances in a pool of previously received utterances included the intent value speak_representative. In 452 utterances of the 457 instances, the appropriate label for each of the utterances was the label "AGENT". In 4 of the 457 instances, the appropriate label for each of the utterances was the label "AGENT_BILLING". In 1 of the 457 instances, the appropriate label for respective utterance was the label "BILLING".

Accordingly, the candidate word groupings 145 derived for an utterance can indicate that a respective utterance may fall under one or more of multiple different classes such as "AGENT" (a majority label for an utterance including speak_representative), "AGENT_BILLING" (a minority label for an utterance including speak_representative), and "BILLING" (a minority label for an utterance including speak_representative).

Figure 13:
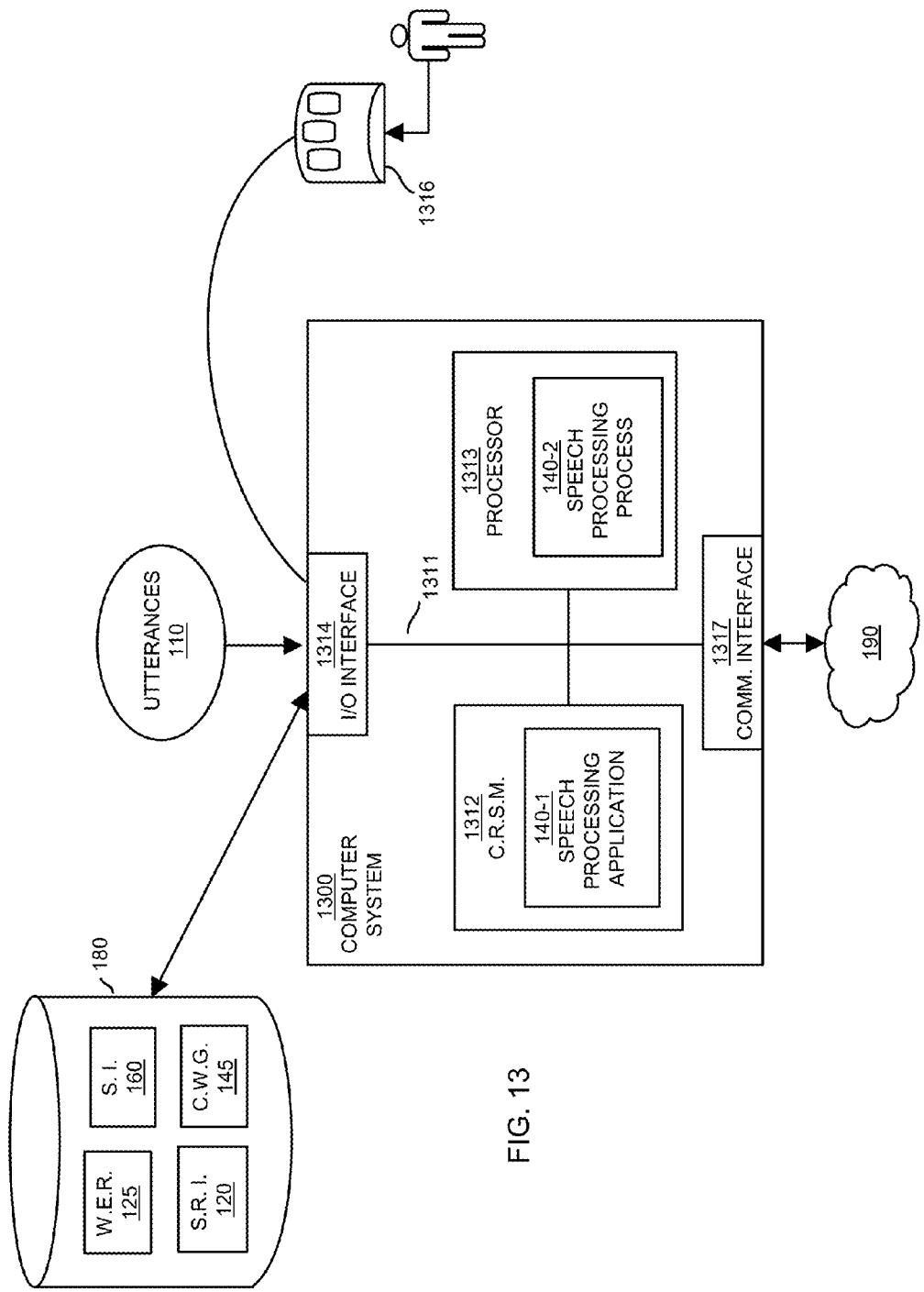
FIG. 13 is a diagram illustrating an example computer architecture for executing a speech processing system according to embodiments herein.

FIG. 13 is a diagram illustrating an example computer architecture for executing a speech processing system 100 according to embodiments herein.

Computer system 1300 can include one or more computerized devices such as a personal computer, workstation, portable computing device, console, network terminal, processing device, network device, etc., operating as a server, client, etc. The speech processing application 140-1 can be configured to include instructions to carry out any or all of the operations associated with syntactic parser 115, word extractor 120, analyzer 150, etc.

Note that the following discussion provides a basic embodiment indicating how to execute aspects of speech processing system 100 according to embodiments herein. However, it should be noted that the actual configuration for carrying out the operations as described herein can vary depending on a respective application.

As shown, computer system 1300 of the present example includes an interconnect 1311 that couples computer readable storage media 1312 such as a non-transitory type of media in which digital information can be stored and retrieved, a processor 1313, I/O interface 1314, and a communications interface 1317.

I/O interface 1314 enables receipt of utterances 110. I/O interface 1314 provides connectivity to repository 180 and, if present, other devices such as display screen, peripheral devices 316, keyboard, computer mouse, etc. Resources such as word extraction rules 125, statistical information 160, syntactic relationship information 120, candidate word groupings, etc. can be stored and retrieved from repository 180.

Computer readable storage medium 1312 can be any suitable device such as memory, optical storage, hard drive, floppy disk, etc. In one embodiment, the computer readable storage medium 1312 is a non-transitory storage media to store instructions and/or data.

Communications interface 1317 enables the computer system 1300 and processor 1313 to communicate over a network 190 to retrieve information from remote sources and communicate with other computers. I/O interface 1314 enables processor 1313 to retrieve or attempt retrieval of stored information from repository 180.

As shown, computer readable storage media 1312 can be encoded with speech processing application 140-1 (e.g., software, firmware, etc.) executed by processor 1313.

During operation of one embodiment, processor 1313 accesses computer readable storage media 1312 via the use of interconnect 1311 in order to launch, run, execute, interpret or otherwise perform the instructions of speech processing application 140-1 stored on computer readable storage medium 1312. As previously discussed, speech processing application 140-1 can include appropriate instructions, parsers, language models, analyzers, etc., to carry out any or all functionality associated with the speech processing system 100 as discussed herein.

Execution of the speech processing application 140-1 produces processing functionality such as speech processing process 140-2 in processor 1313. In other words, the speech processing process 140-2 associated with processor 1313 represents one or more aspects of executing speech processing application 140-1 within or upon the processor 1313 in the computer system 1300.

Those skilled in the art will understand that the computer system 1300 can include other processes and/or software and hardware components, such as an operating system that controls allocation and use of hardware resources to execute speech recognition application 140-1.

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device.

Functionality supported by speech processing system 100 and speech processing application 140-1 will now be discussed via flowcharts in FIGS. 14-16. As discussed above, the speech recognition system 140 can be configured to execute the steps in the flowcharts as discussed below.

Note that there will be some overlap with respect to concepts discussed above. Also, note that the steps in the below flowcharts need not always be executed in the order shown. That is, the steps can be executed in any suitable order.

Figure 14:
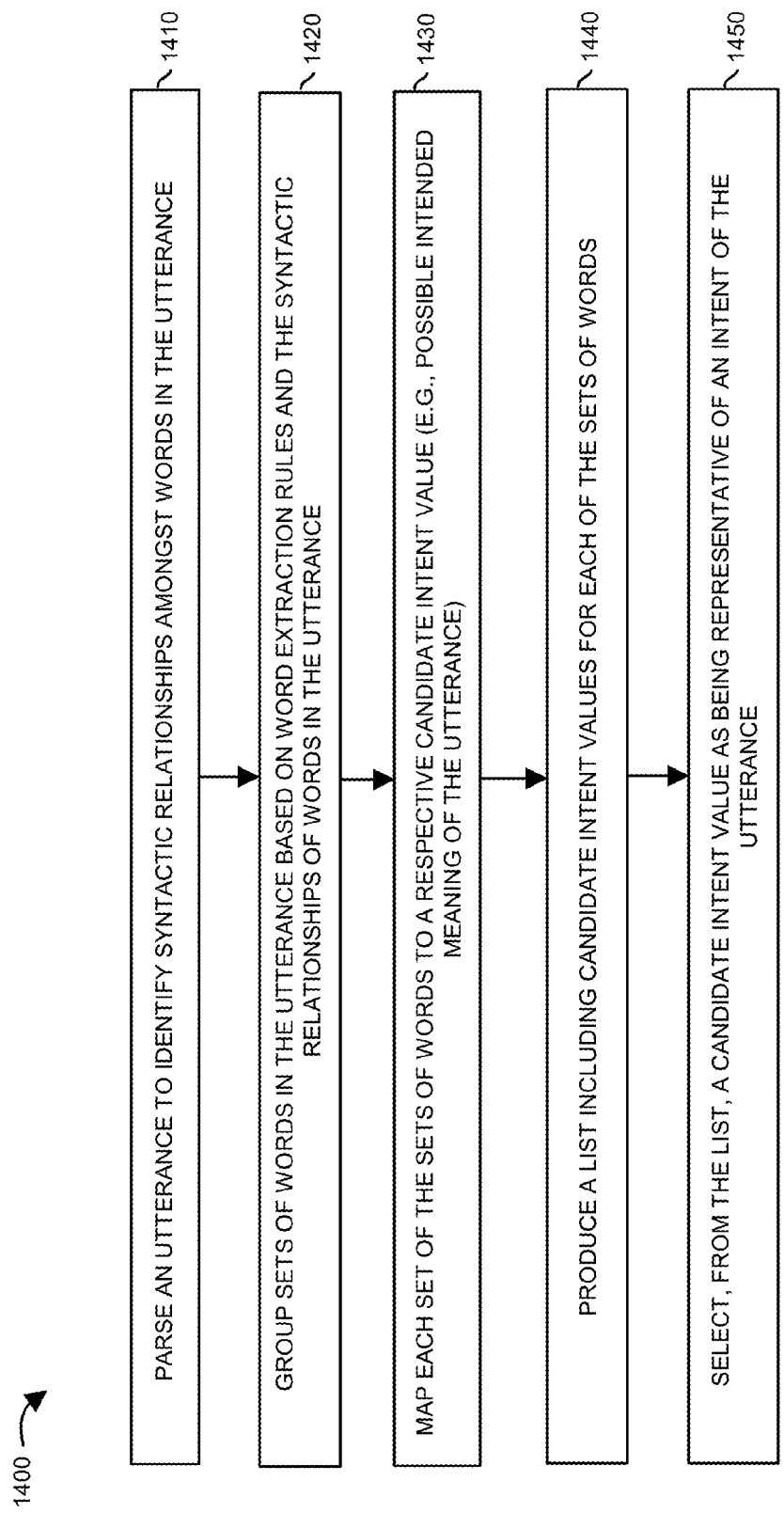
FIG. 14 is a flowchart illustrating an example method of implementing a speech processing system according to embodiments herein.

FIG. 14 is a flowchart 1400 illustrating a general technique of implementing a speech processing system 100 and related resources according to embodiments herein.

In step 1410, the speech processing system 100 parses an utterance 110-1 to identify syntactic relationships 120-1 amongst words in the utterance 110-1.

In step 1420, the speech processing system 100 groups or creates sets of words from the utterance 110-1 based on word extraction rules and the syntactic relationships of words in the utterance 110-1.

In step 1430, the speech processing system 100 maps each set of the sets of words (e.g., candidate word groupings 145) to a respective candidate intent value (e.g., possible intended meaning of the utterance).

In step 1440, the speech processing system 100 produces a list including candidate intent values for each of the sets of words (e.g., candidate word groupings 145).

In step 1450, the speech processing system 100 selects, from the list, a candidate intent value as being representative of an intent of the utterance.

Figure 15:
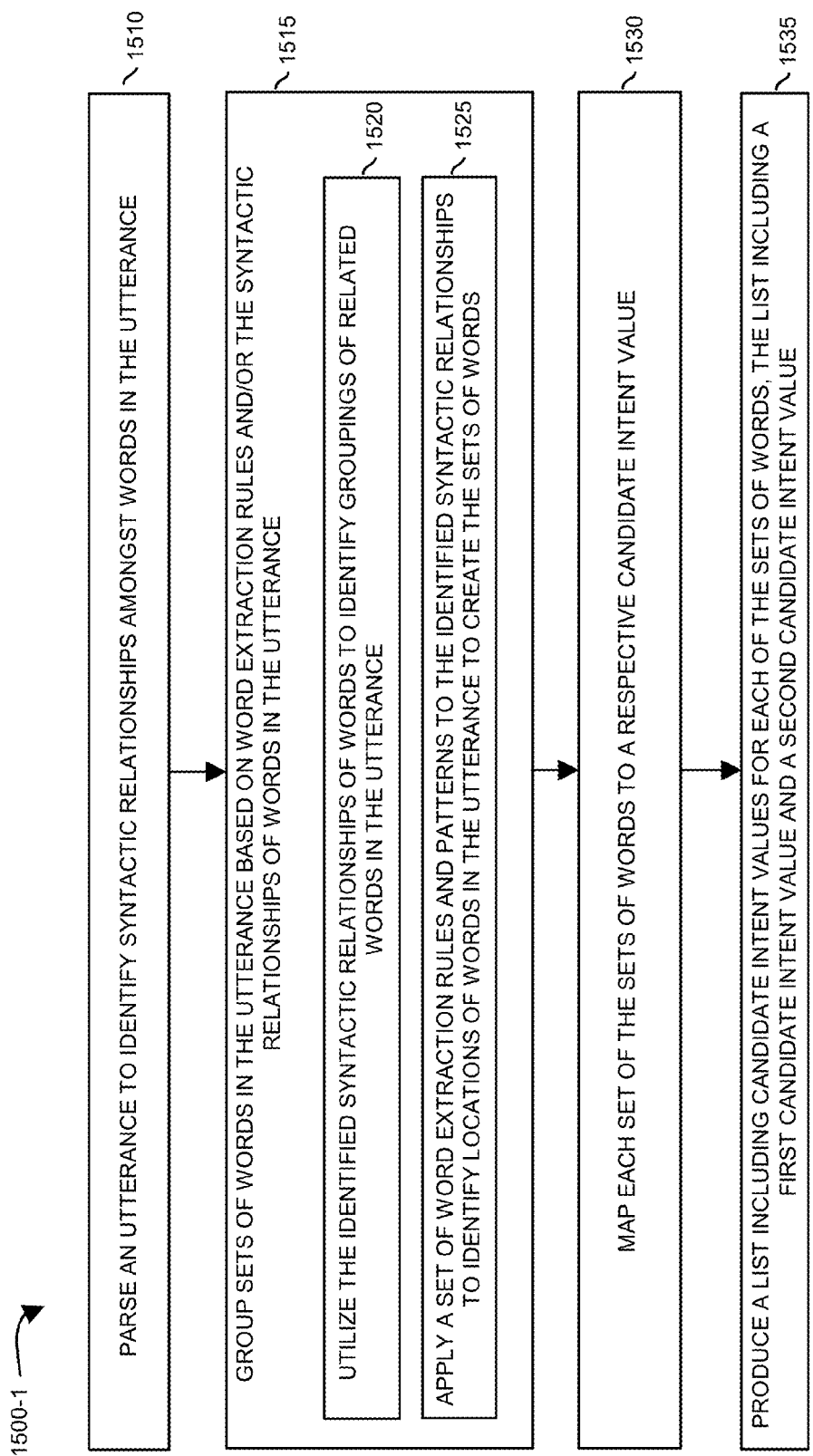
FIGS. 15 and 16 combine to form a flowchart illustrating an example method of implementing speech processing system according to embodiments herein.
Figure 16:
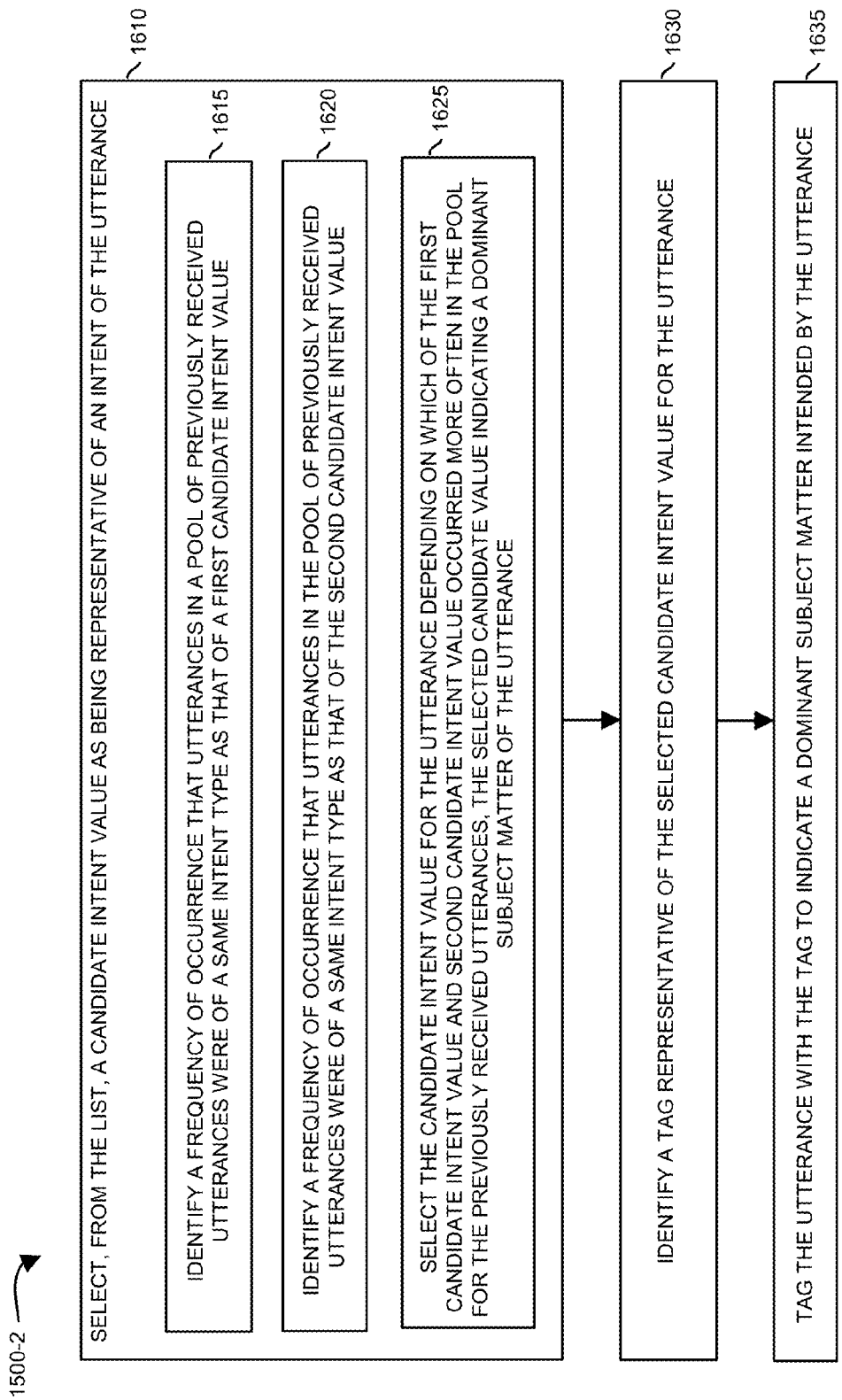

FIGS. 15 and 16 combine to form a flowchart 1500 (e.g., flowchart 1500-1 and flowchart 1500-2) illustrating implementation of a speech processing system 100 according to embodiments herein.

In step 1510, the speech-processing system 100 parses text in a received utterance 110-1 to identify syntactic relationships amongst words in the utterance 110-1.

In step 1515, the speech-processing system 100 groups or creates sets of words from the received utterance based on word extraction rules 125 and/or the syntactic relationships (as specified by syntactic relationship information 120) of words in the utterance.

In sub-step 1520, the speech-processing system 100 utilizes the identified syntactic relationships amongst words to identify groupings (e.g., candidate word groupings 145) of related words in the utterance.

In sub-step 1525, the speech-processing system 100 applies a set of word extraction rules 125 and/or patterns to the identified syntactic relationships and syntactic relationship information 120 to identify locations of words in the utterance to create the sets of words.

In step 1530, the speech-processing system 100 maps each set of the sets of words to a respective candidate intent value.

In step 1535, the speech-processing system 100 produces a list including a candidate intent value for each of the sets of words. In one embodiment, the list includes a first candidate intent value, a second candidate intent value, and so on.

In step 1610, the speech-processing system 100 selects, from the list, a candidate intent value as being representative of an intent of the received utterance.

In sub-step 1615, the speech-processing system 100 identifies a frequency of occurrence that utterances in a pool of previously received utterances were of a same intent type as that of a first candidate intent value.

In step 1620, the speech-processing system 100 identifies a frequency of occurrence that utterances in the pool of previously received utterances were of a same intent type as that of the second candidate intent value.

In step 1625, the speech-processing system 100 selects the candidate intent value for the utterance depending on which of the first candidate intent value and the second candidate intent value occurred more often in the pool for the previously received utterances. The selected candidate value indicates a dominant subject matter representative of the utterance.

In step 1630, the speech-processing system 100 identifies a tag representative of the selected candidate intent value for the utterance.

In step 1635, the speech-processing system 100 tags the utterance with the tag to indicate a dominant subject matter intended by the utterance.

As discussed above, techniques herein are well suited for use in software and/or hardware applications implementing speech recognition and classification of utterances based on intended meanings. However, it should be noted that embodiments herein are not limited to use in such applications and that the techniques discussed herein are well suited for other applications Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:

via computer processor hardware, performing operations of:

parsing an utterance to identify syntactic relationships amongst words in the utterance;

creating sets of words from the utterance based on the syntactic relationships;

mapping each set of the sets of words to a respective candidate intent value to produce a list of candidate intent values for the utterance;

ranking the candidate intent values in the list based on usage of the sets of words in previously received utterances;

selecting, from the list, a candidate intent value as being representative of an intent of the utterance;

detecting that the selected candidate intent value maps to multiple possible labels in a label listing, an entry in the label listing indicating that the selected candidate intent value maps to the multiple possible labels, the multiple possible labels including a majority label representing a first classification and a minority label representing a second classification;

selecting the majority label;

assigning the selected majority label to the utterance to indicate that the utterance falls into the first classification, the selected majority label representative of a dominant subject matter likely intended by the utterance.

2. The method as in claim 1 further comprising:
identifying a tag representative of the selected candidate intent value for the utterance; and
tagging the utterance with the selected majority label.

3. The method as in claim 1, wherein creating the sets of words in the utterance includes:
producing a first set of words to include a first word and a second word in the utterance, the first word being syntactically related to the second word as indicated by the identified syntactic relationships; and
producing a second set of words to include a third word and a fourth word in the utterance, the third word being syntactically related to the fourth word as indicated by the identified syntactic relationships.

4. The method as in claim 1, wherein creating the sets of words in the utterance includes:
utilizing the identified syntactic relationships of words to identify groupings of related words in the utterance; and
applying a set of pattern rules to the identified syntactic relationships to identify locations of words in the utterance to create the sets of words.

5. The method as in claim 4 further comprising:
based on the identified locations of words:
producing a first set of words to include a first word and a second word in the utterance, the first word being syntactically related to the second word as indicated by the identified syntactic relationships; and
producing a second set of words to include a third word and a fourth word in the utterance, the third word being syntactically related to the fourth word as indicated by the identified syntactic relationships.

6. The method as in claim 1, wherein creating the sets of words from the utterance includes:
utilizing the identified syntactic relationships of words to identify how the words in the utterance are related; and
initiating application of pattern rules to related words in the utterance, the pattern rules specifying which type of related words in the utterance to create the sets of words.

7. The method as in claim 6, wherein initiating application of the pattern rules includes:
producing the sets of words to include a first set of words and a second set of words, the first set of words including a first word and a second word retrieved from the utterance, the second set of words including a third word and a fourth word retrieved from the utterance.

8. The method as in claim 7, wherein mapping each set includes:
mapping the first set of words to a first candidate intent value; and
mapping the second of words to a second candidate intent value.

9. The method as in claim 8, wherein selecting the candidate intent value includes:
identifying a frequency of occurrence that utterances in a pool of the previously received utterances were of a same intent type as that of the first candidate intent value;
identifying a frequency of occurrence that utterances in the pool of the previously received utterances were of a same intent type as that of the second candidate intent value; and
selecting the candidate intent value for the utterance depending on which of the first candidate intent value and second candidate intent value occurred more often in the pool for the previously received utterances, the selected candidate value indicating the dominant subject matter of the utterance.

10. The method as in claim 1 further comprising:
maintaining statistical information for the previously received utterances, the statistical information indicating a frequency of receiving utterances of different intent types; and
updating the statistical information to reflect that the utterance was assigned the selected candidate intent value.

11. The method as in claim 1 further comprising:
for each respective type of multiple types of utterance labels, tracking sets of words that commonly appear in utterances of the respective type.

12. A computer-readable hardware storage medium having instructions stored thereon for processing data information, such that the instructions, when carried out by a processing device, cause the processing device to perform operations of:
parsing an utterance to identify syntactic relationships amongst words in the utterance;
creating sets of words from the utterance based on the syntactic relationships;
mapping each set of the sets of words to a respective candidate intent value to produce a list of candidate intent values for the utterance;
ranking the candidate intent values in the list based on usage of the sets of words in previously received utterances; and
selecting, from the list, a candidate intent value as being representative of an intent of the utterance;
detecting that the selected candidate intent value maps to multiple possible labels in a label listing, an entry in the label listing indicating that the selected candidate intent value maps to the multiple possible labels, the multiple possible labels including a majority label representing a first classification and a minority label representing a second classification;
selecting the majority label; and
assigning the selected majority label to the utterance to indicate that the utterance falls into the first classification, the selected majority label representative of a dominant subject matter likely intended by the utterance.

13. The computer-readable hardware storage medium as in claim 12, wherein creating the sets of words in the utterance includes:
utilizing the identified syntactic relationships of words to identify groupings of related words in the utterance; and
applying a set of pattern rules to the identified syntactic relationships to identify locations of words in the utterance to create the sets of words.

14. The computer-readable hardware storage medium as in claim 13 further including instructions stored thereon that causes the processing device to perform operations of:
based on the identified locations of words:
producing a first set of words to include a first word and a second word in the utterance, the first word being syntactically related to the second word as indicated by the identified syntactic relationships; and
producing a second set of words to include a third word and a fourth word in the utterance, the third word being syntactically related to the fourth word as indicated by the identified syntactic relationships.

15. The computer-readable hardware storage medium as in claim 12, wherein creating the sets of words in the utterance includes:
utilizing the identified syntactic relationships of words to identify how the words in the utterance are related; and initiating application of pattern rules to related words in the utterance, the pattern rules specifying which type of related words in the utterance to create the sets of words.

16. The computer-readable hardware storage medium as in claim 15, wherein initiating application of the pattern rules includes:
producing the sets of words to include a first set of words and a second set of words, the first set of words including a first word and a second word retrieved from the utterance, the second set of words including a third word and a fourth word retrieved from the utterance.

17. The computer-readable hardware storage medium as in claim 16, wherein mapping each set includes:
mapping the first set of words to a first candidate intent value; and
mapping the second of words to a second candidate intent value.

18. The computer-readable hardware storage medium as in claim 17, wherein selecting the candidate intent value includes:
identifying a frequency of occurrence that utterances in a pool of previously received utterances were of a same intent type as that of the first candidate intent value;
identifying a frequency of occurrence that utterances in the pool of previously received utterances were of a same intent type as that of the second candidate intent value; and
selecting the candidate intent value for the utterance depending on which of the first candidate intent value and second candidate intent value occurred more often in the pool for the previously received utterances, the selected candidate value indicating a dominant subject matter of the utterance.

19. The computer-readable hardware storage medium as in claim 12 further including instructions stored thereon that causes the processing device to perform operations of:
maintaining statistical information for a pool of previously received utterances, the statistical information indicating a frequency of receiving utterances of different intent types; and
updating the statistical information to reflect that the utterance was assigned the selected candidate intent value.

20. The computer-readable hardware storage medium as in claim 12 further including instructions stored thereon that causes the processing device to perform operations of:
for each respective type of multiple types of utterance labels, tracking sets of words that commonly appear in utterances of the respective type.

21. A computer system comprising:
a processor;
a memory unit that stores instructions associated with an application executed by the processor; and
an interconnect coupling the processor and the memory unit, enabling the computer system to execute the application and perform operations of:
parsing an utterance to identify syntactic relationships amongst words in the utterance;
creating sets of words from the utterance based on the syntactic relationships;
mapping each set of the sets of words to a respective candidate intent value to produce a list of candidate intent values for the utterance;
ranking the candidate intent values in the list based on usage of the sets of words in previously received utterances; and
selecting, from the list, a candidate intent value as being representative of an intent of the utterance;
detecting that the selected candidate intent value maps to multiple possible labels in a label listing, an entry in the label listing indicating that the selected candidate intent value maps to the multiple possible labels, the multiple possible labels including a majority label representing a first classification and a minority label representing a second classification;
selecting the majority label; and
assigning the selected majority label to the utterance to indicate that the utterance falls into the first classification, the selected majority label representative of a dominant subject matter likely intended by the utterance;
detecting that the selected candidate intent value maps to multiple possible labels in a label listing, an entry in the label listing indicating that the selected candidate intent value maps to the multiple possible labels, the multiple possible labels including a majority label representing a first classification and a minority label representing a second classification;
selecting the majority label; and
assigning the selected majority label to the utterance to indicate that the utterance falls into the first classification, the selected majority label representative of a dominant subject matter likely intended by the utterance.

22. The method as in claim 1, wherein each of the candidate intent values represents a corresponding pre-identified combination of words detected as being present in the previously received utterances, the method further comprising:
storing statistical information indicating how often instances of each respective pre-identified combination of words was found in the previously received utterances.

23. The method as in claim 22, wherein creating sets of words includes producing the sets of words to include at least a first set of words and a second set of words, the first set of words including a first word and a second word retrieved from the utterance, the second set of words including a third word and a fourth word retrieved from the utterance; and
wherein mapping each set includes: mapping the first set of words to a first candidate intent value and mapping the second set of words to a second candidate intent value.

24. The method as in claim 23 further comprising:
accessing the statistical information to identify a first numerical value, the first numerical value assigned to the first candidate intent value, the first numerical value indicating a degree to which the first set of words was detected as being present in the previously received utterances;
accessing the statistical information to identify a second numerical value, the second numerical value assigned to the second candidate intent value, the second numerical value indicating a degree to which the second set of words was detected as being present in the previously received utterances; and
ranking the list of candidate intent values for the utterance in accordance with the first numerical value and the second numerical value.

25. The method as in claim 24, wherein ranking the list of candidate intent values includes:
comparing a magnitude of the first numerical value and a magnitude of the second numerical value;
in response to detecting that the magnitude of the first numerical value is greater than the magnitude of the second numerical value, ranking the first candidate intent value higher in the list than the second candidate intent value, the method further comprising:

in accordance with the ranking, selecting the first candidate intent value as being representative of The utterance.

26. The method as in claim 25, wherein detecting that the selected candidate intent value maps to multiple possible labels includes detecting that the first candidate intent value maps to multiple possible labels.

27. The method as in claim 1 further comprising:

producing syntactic relationship information, the syntactic relationship information indicating a syntax of the words in the utterance; and applying word extraction rules to create the sets of words from the words in the utterance, the word extraction rules specifying how to create word groupings based on the syntax of the words as specified by the syntactic relationship information.

* * * * *